F. W. WOOD.
AUTOMATIC PIANO.
APPLICATION FILED AUG. 13, 1906.

901,929.

Patented Oct. 20, 1908.

5 SHEETS—SHEET 2.

Witnesses
Frank R Glore
H. C. Rodgers

Inventor
F. W. Wood
By George H Thorpe
Atty.

F. W. WOOD.
AUTOMATIC PIANO.
APPLICATION FILED AUG. 13, 1906.
901,929.
Patented Oct. 20, 1908.
5 SHEETS—SHEET 3.
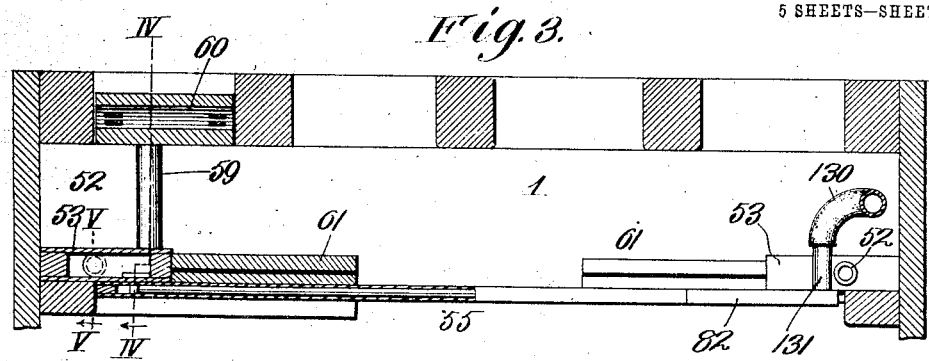
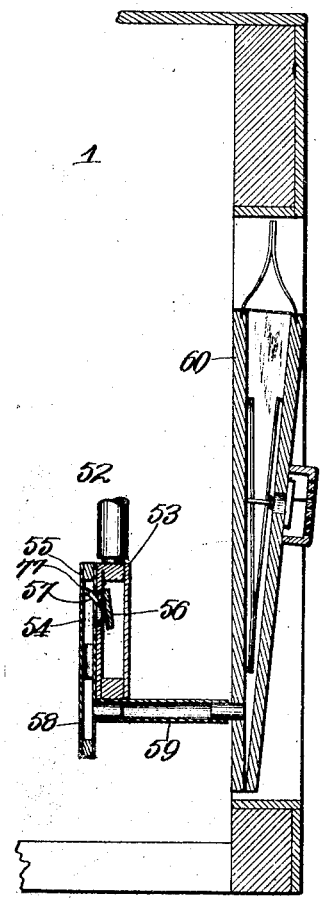
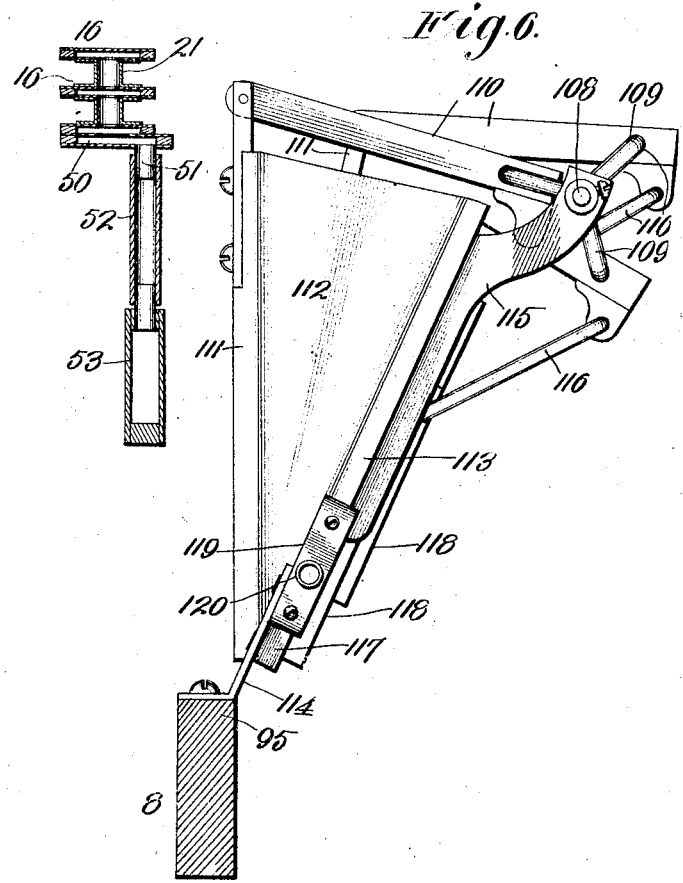
Witnesses
Frank R. Glore
H. C. Rodgers
Inventor
F. W. Wood.
By George J. Looper
Atty.

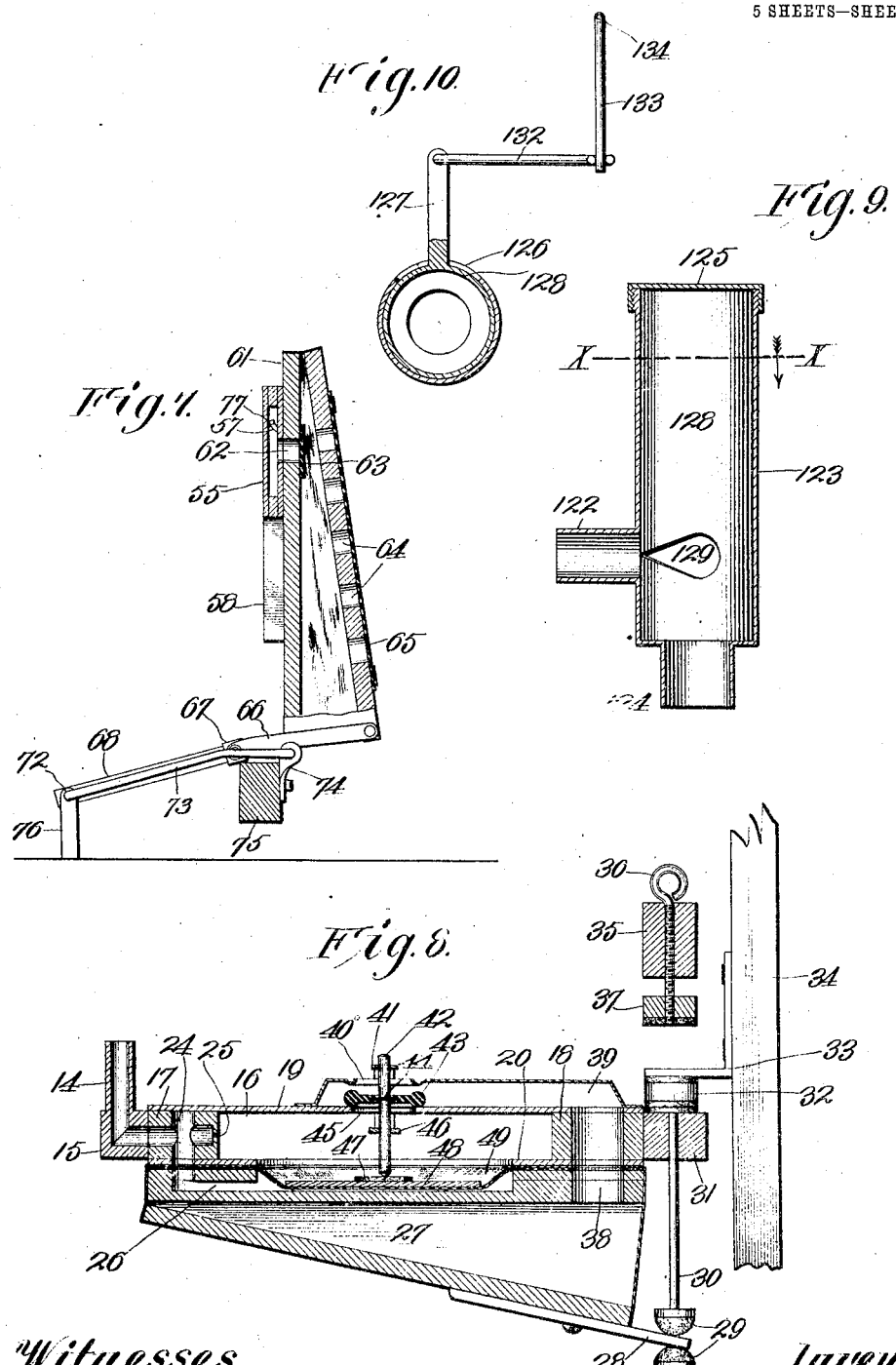

F. W. WOOD.
AUTOMATIC PIANO.
APPLICATION FILED AUG. 13, 1906.
901,929.
Patented Oct. 20, 1908.
5 SHEETS—SHEET 5.
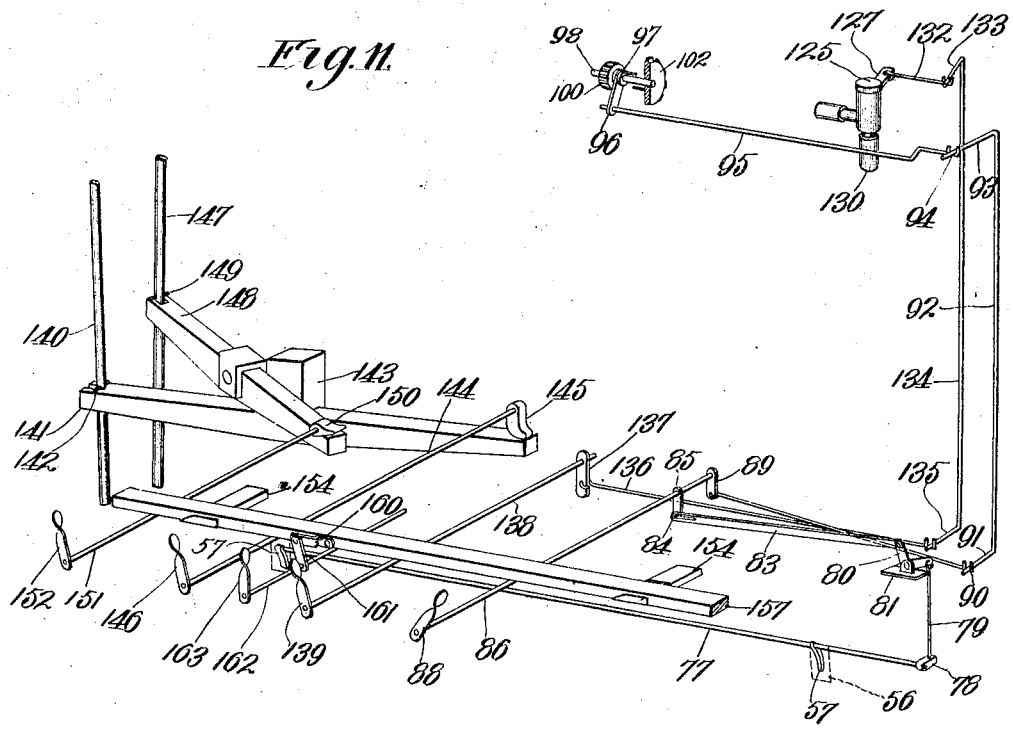
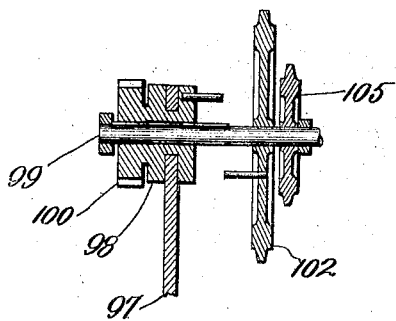
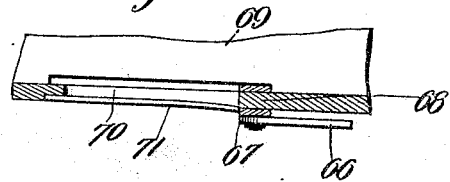
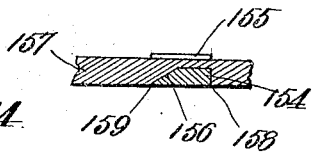
Witnesses
Frank R Glore
H. C. Rodgers
Inventor
F. W. Wood
By George Y. Thorpe
Atty

UNITED STATES PATENT OFFICE.

FREDERICH W. WOOD, OF KANSAS CITY, MISSOURI, ASSIGNOR TO BERRY-WOOD PIANO PLAYER CO., OF KANSAS CITY, MISSOURI.

AUTOMATIC PIANO.

No. 901,929.  Specification of Letters Patent.  Patented Oct. 20, 1908.

Application filed August 13, 1906. Serial No. 330,467.

*To all whom it may concern:*

Be it known that I, FREDERICH W. WOOD, a citizen of the United States, residing at Kansas City, in the county of Jackson and State of Missouri, have invented certain new and useful Improvements in Automatic Pianos, of which the following is a specification.

This invention relates to automatic pianos and my object is to produce mechanism which can be installed in piano cases of standard type now on the market, without enlarging said cases in any particular or necessitating any change in or rearrangement of the piano mechanism.

With the above object in view and others as hereinafter appear, the invention consists in certain novel and peculiar features of construction and organization as hereinafter described and claimed; and in order that it may be fully understood reference is to be had to the accompanying drawings, in which—

Figure 1:
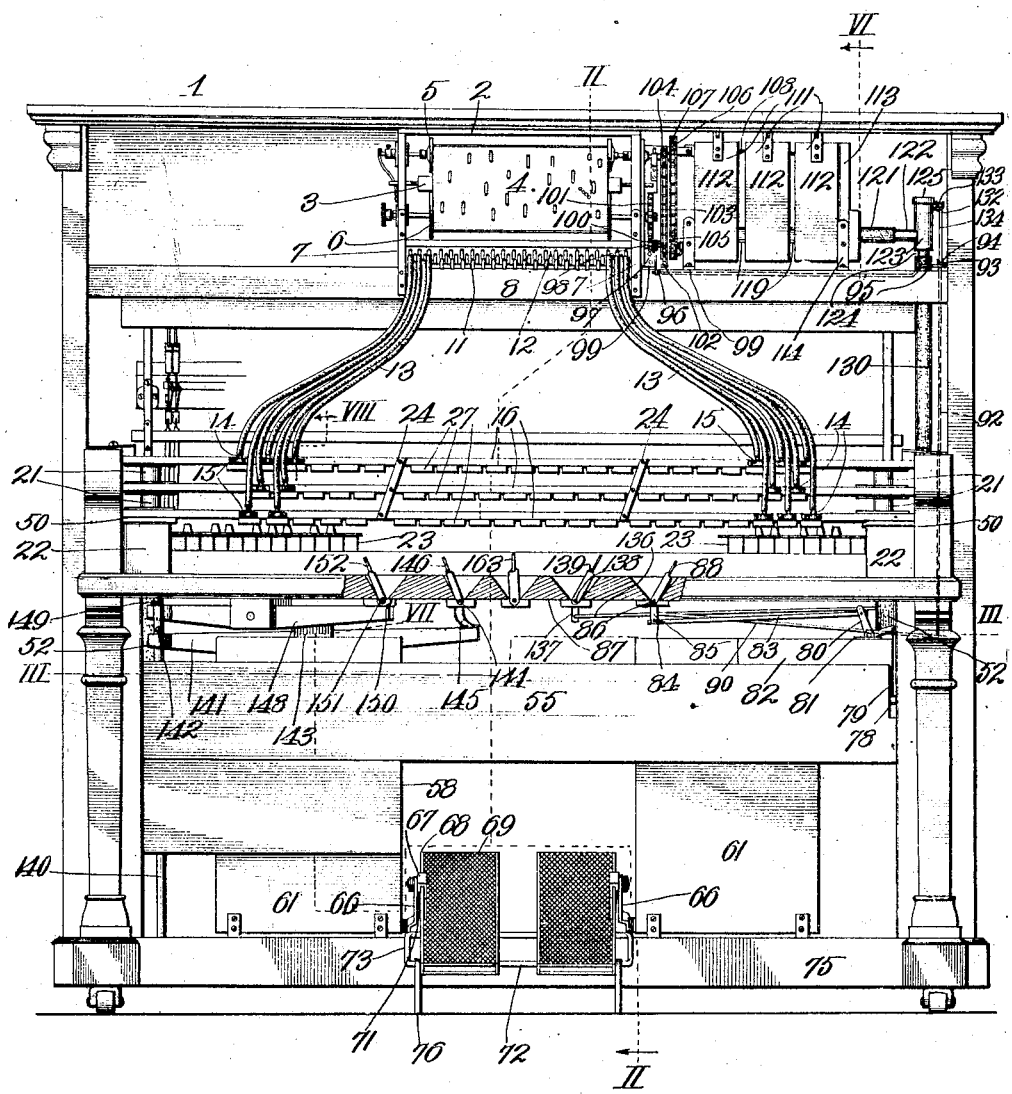
Figure 2:
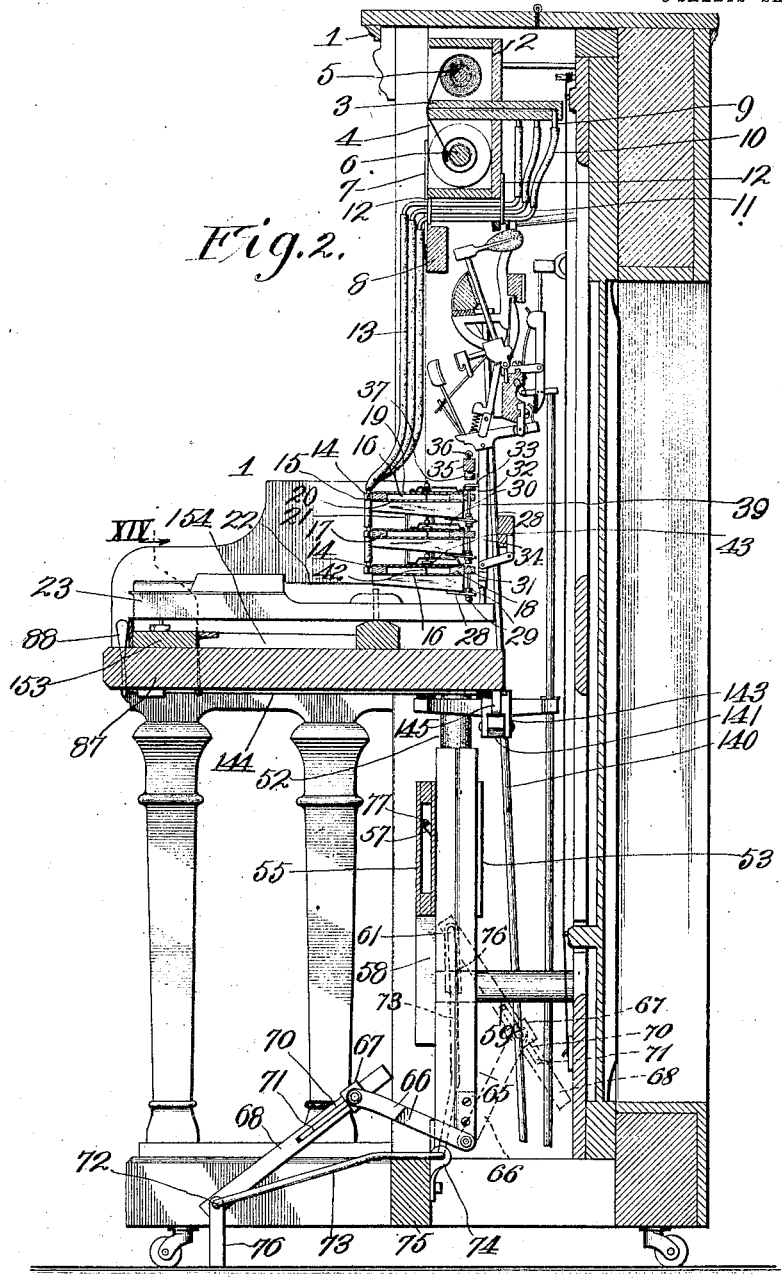

Figure 1, is a front view of a piano equipped with playing mechanism embodying my invention, the front of the piano case and most of the piano mechanism being omitted. Fig. 2, is an enlarged central vertical section taken on the line II—II of Fig. 1. Fig. 3, is a horizontal section taken on the line III—III of Fig. 1. Fig. 4, is a vertical section on the line IV—IV of Fig. 3. Fig. 5, is a vertical section taken on the line V—V of Fig. 3. Fig. 6, is a vertical section on the dotted line VI, of Fig. 1. Fig. 7, is a vertical section of Fig. 1, but only showing the lower portion of said figure with the bellows and wind chest in section on the dotted line VII of Fig. 1 and the pedal seen from line II of Fig. 1, this figure showing the bellows extended instead of collapsed as in Fig. 2. Fig. 8, is an enlarged section on the dotted line VIII of Fig. 1. Fig. 9, is a central vertical section of the casing of the air-controlling valve, with the interior of said valve shown in elevation. Fig. 10, is a section taken approximately on the line X—X of Fig. 9. Fig. 11, is a detail perspective view illustrating the general arrangement and relation of certain parts of the mechanism. Fig. 12, is a vertical section of part of the mechanism for effecting the winding of the note-sheet from the roller to the drum and vice versa. Fig. 13 is a horizontal section to illustrate certain features of the pedal mechanism. Fig. 14, is a section on the dotted line XIV of Fig. 2.

In the said drawings, 1 indicates a piano of the usual or any preferred type.

2 indicates a box in the upper central portion of the piano, 3 the tracker bar projecting forwardly into said box, and 4 the perforated note-sheet to travel over said tracker bar from the note-sheet roller 5 to the winding drum 6 and vice versa, above and below the tracker bar within said box. 7 indicates bars supporting said box and secured at their lower ends to the cross bar 8 of the piano case.

9 indicates tubes communicating with the passages of the tracker bar and 10 flexible tubes leading from tubes 9 to the upturned ends of tubes 11 carried by plates 12 depending from the box, the down-turned or front ends of tubes 11 being connected by flexible tubes 13 to the upwardly projecting tubes 14 of blocks 15 secured to the front sides of preferably metallic wind chests 16, there being preferably three of such chests, each consisting of a front wall 17, a rear wall 18, a top wall 19, and a bottom wall 20. The wind chests 16 are connected near their ends and supported one above the other by metallic tubes 21, the lower wind chest being mounted at its ends on and communicating with boxes hereinafter described secured upon the end blocks 22 of the piano and said wind chests bridge the rear ends of the piano keys 23, as shown most clearly in Fig. 2.

24 indicates passages in the front walls of the wind chests connected to tubes 14 and through vent holes 25 to the wind chests. Said passages are also connected to the chambers 26 in the upper or stationary walls of pneumatics 27, which are provided with arms 28 projecting between cushioned collars 29 on rods 30 extending slidingly through cross bars 31 rigid with the wind chests and provided with cushioned heads 32 engaging the undersides of brackets 33 secured to the thrust rods or abstracts 34 of the piano.

35 indicates a cross bar secured in the piano case above angle brackets 33, and 36 adjustable screws in said bar provided with cushioned heads 37 at their lower ends to positively limit the upward movement of the abstracts.

38 are passages connecting the pneumatics 27 with passages or chambers 39 having openings 40 bridged at their upper sides by guide bars 41 for vertical valve stems 42 provided with valves within the chamber 39, said valves preferably consisting of disks 44, embedded in rubber disks 43 having their peripheries beaded or enlarged. These valves normally close openings 45 connecting chambers 39 with their respective wind chests and below said openings 45 are guide bars 46 for the lower portions of the valve stems, the latter resting at their lower ends on the cushions 47 of plates 48 secured to the rubber or equivalent diaphragms 49 adapted ordinarily to be depressed into chambers 26.

The boxes hereinbefore referred to as supporting and communicating with the bottom wind chest (see Fig. 5) are numbered 50 and are provided with depending tubes 51 connected by tubes 52 with boxes 53 secured within the piano casing below the key-board and connected by passages 54 with the wind throat 55 extending horizontally and transversely of the piano case and secured thereto in any suitable manner.

56 are flap valves for closing passages 54 and 57 are arms to open said valves at the proper time and through instrumentalities hereinafter described.

58 indicates a box forming a pendent extension for the wind throat and connected below the latter by a rearwardly extending tube 59 to the equalizer 60 shown in Figs. 3 and 4 but not particularly described because of common and well-known construction and operation.

61 indicates a pair of bellows secured in the lower front portions of the case between boxes 53 as shown most clearly in Fig. 3 and having their front or immovable walls secured to the wind throat and provided with passages 62 communicating therewith, see Fig. 7. Flap valves 63 control such passages and the rear or movable walls of the bellows are provided with one or more passages 64 controlled by flap valves 65.

66 indicate arms pivoted to the lower ends of the movable walls of the bellows and to sleeves 67 mounted slidingly on the outer side bars 68 of a pair of pedals 69.

70 indicates longitudinal slots in said pedal side bars and 71 flat springs secured to the side bars and normally disposed at their rear end in the path of said sleeves but capable of being pressed into the slots to permit the sleeves to slide forwardly on said side bars when the pedals are folded into the case, it being understood that the pedals are adapted to project forwardly through the case when the piano is to be played through the instrumentality of the mechanism forming the subject matter of the present application. The pedals are fulcrumed at their front ends on rod 72 provided with side arms 73 pivoted in brackets 74 secured to the inner side of the sill 75 of the piano, and pivoted on rod 72 at the outer sides of the pedals are legs 76 to coöperate with the bearing brackets 74 in supporting the pedals while in operation or in position for operation.

77 indicates a rock shaft extending longitudinally of and within the wind throat and carrying the arms 57 hereinbefore described, see Figs. 3 and 4, for opening flap valves 56, said rock shaft being journaled in any suitable manner and provided at its right hand end with a crank arm 78 connected by link 79 to the bell crank 80 mounted on bracket 81 of the box 82 upon wind throat 55 and hereinafter referred to. A link 83 is connected to the other arm of the bell crank and has a pin and slot connection 84 with the crank arm 85 of the rock shaft 86 extending substantially parallel with the piano case below the horizontal shelf 87 underlying the piano keys, said rock shaft being provided with a short lever or handle 88 at its front end. At its rear end the shaft is provided with a depending crank arm 89 connected to the forked link 90 engaging the lower crank arm 91 of a vertical rock shaft 92 suitably journaled in the piano case near its right hand side and provided at its upper end with a crank arm 93 engaging the forked end 94 of a slide rod 95 mounted on a bar in the piano case.

96 indicates an arm secured to rod 95 and bearing a journaled relation to and adapted to shift a clutch 97 keyed to slide upon and rotate with a short shaft 98 suitably journaled in brackets 99, secured to bar 8.

100 is a cog pinion rigid with clutch 97 and adapted when the piano is being played to engage and operate cog wheel 101 on the shaft of the winding drum 6. 102 indicates a clutch faced sprocket wheel journaled on shaft 98 and connected by chain 103 to sprocket wheel 104 on the shaft of roller 5. 105 is a sprocket wheel rigidly mounted on shaft 98 and connected by chain 106 to the sprocket wheel 107 on the motor shaft 108, said motor shaft having radial cranks 109, pivotally connected by links 110 to arms of the movable walls 111 of the motor pneumatics 112, the immovable walls 113 of said pneumatics being supported by one of the brackets 99, and brackets 114 projecting upwardly from bar 8.

115 indicates arms rigid with the rear walls of the pneumatics and forming journals for the motor shaft 108 and 116 indicates links connecting the lower ends of links 110, to the slide valves 117 of the motor pneumatics; said slide valves being adapted to reciprocate in guides 118. In practice the slide valves alternately cover and uncover openings in the rear or immovable sides of the motor pneumatics which openings are not herein shown as they are common and well known in mechanical piano playing mechanisms, in fact the entire structure of the motor pneumatics is of common and well-known type and the same is true of the mechanism for effecting the travel of the note sheet in one direction or the other. For this reason the motor pneumatics and the gearing hereinbefore described is not detailed to any extent.

119 indicates tubes connecting the motor pneumatics and 120 a tube projecting from the right-hand pneumatic and connected by a flexible tube 121 to the tubular arm 122 of a cylinder 123, provided with a reduced depending neck 124 and a cap 125. The cylinder 123 is provided with a slot 126 through which projects rearwardly an arm 127 of a hollow cylindrical valve 128 fitting with an air-tight relation in the cylinder and provided with a substantially V-shaped opening 129 adapted as the valve is turned as hereinafter explained to be thrown into or out of register with tubular arm 122, the tapering form of the opening resulting in gradually increasing or diminishing the area of communication between the interior of the valve and said tubular arm accordingly as the former is turned in one direction or the other.

130 indicates a flexible tube connecting neck 124 with a short tube 131 projecting from and communicating with box 82 hereinbefore described (see Figs. 1 and 3). 132 is a link pivoted to arm 127 and having a forked outer end engaging crank arm 133 of a vertical shaft 134 suitably journaled in the piano case and provided with a crank arm 135 engaging the forked end of a link 136 pivoted to the lower end of the crank arm 137 of a rock shaft 138 paralleling the piano keys and suitably journaled at the underside of shelf 87 and provided at its front end with a lever handle 139.

140 indicates the upright of the piano mechanism for adjusting the hammer rail and thereby disposing the hammers nearer to the strings of the instrument when it is desired to produce soft music.

141 is a rock lever slidingly engaging 140 and adapted to raise the latter through the instrumentality of the overlying pin 142, said rocker lever being pivoted to a bracket 143 depending from shelf 87 or an equivalent fixed point of the piano case.

144 indicates a suitably journaled rock shaft provided with a cam 145 at its rear end to operate the rock lever and thereby raise rod 140, said rock shaft having a lever or handle 146 at its front end. 147 indicates the usual piano rod for effecting the withdrawal of the damper from the strings in order to produce loud music.

148 indicates a rock lever underlying cross pin 149 carried by said rod, said lever being adapted to be pivotally suspended from the shelf 87 or an equivalent support.

150 is a cam to operate said rock shaft and thereby raise said rod 147 for the purpose of producing loud music as above explained, said cam being mounted on the rear end of the rock shaft 151 suitably journaled and provided at its front end with a lever or handle 152.

153 indicates a transverse bar secured upon shelf 87 below the front ends of the keys and 154 bars extending rearwardly from bar 153 and provided at the rear side of the latter with transverse notches 155 having their base portions tapering downwardly and to the left as at 156.

157 indicates a transverse slide bar having notched portions fitting in notches 155, the notches 158 of said slide bar terminating at their left hand ends in beveled surfaces 159.

160 is a link pivotally connecting bar 157 with the crank arm 161 of a rock shaft 162, provided with a lever or handle 163 at its front end and journaled at the underside of the shelf 87 in any suitable manner and in this connection it will be noticed that the various levers or handles 88, 139, 146, 152, and 163 project up through openings in the shelf 87 and are within convenient reach of the operator.

The front, not shown, of the piano case will be modified only in the sense that it will be provided with a door to be opened when it is desired to play the piano through the action of the mechanism embodying my invention, the pedals being swung from the position shown in dotted lines to the position shown in full lines Fig. 2. After arranging the pedals as stated, lever 88 is thrown to the position shown in Figs. 1 and 11 for the purpose of throwing pinion 100 into engagement with gear wheel 101. Pressure is then alternately applied on the pedals to operate the bellows 61, the result of this operation drawing the air from the motor pneumatics 111. The collapse of the pneumatics occurs in rotation and thereby imparts rapid rotation to shaft 108 through the medium of the links 110 and cranks 109, the operation of the pneumatics likewise resulting in the opening of their valves so as to take in air immediately after they are collapsed, the air withdrawn from the motor pneumatics passing through the tubes 121 and 130 to the box 82, in communication with the wind throat 55 and from the latter the air passes through passages 62 into the bellows as the latter are expanding, said air being exhausted through apertures 64 on the next collapse of the bellows induced by foot pressure.

The operation of the shaft 108 by the motor pneumatic through the action of the sprocket wheel 107, chain 106 and sprocket 105 drives shaft 98 and the latter through the engagement of its pinion with wheel 101 operates the winding drum and causes the note sheet to travel downward unwinding from roller 5 and winding on said drum, it being understood that the lower end of the note sheet will be detachably hooked, not shown, in the customary manner to the winding drum. As the note sheet travels and its perforations register with the tracker bar passages, air enters such passages and passes down through the connecting tubes into their respective passages 24, the larger portion of such air entering the connecting chambers 26 and raising the diaphragms 49, the elevation of the diaphragms causing their respective valves 43 to open communication between the wind chests and chambers 39 and close communication between the latter and the atmosphere through openings 40. This action is instantly followed by the collapse of the pneumatics 27 as the air therein which entered by way of openings 40, chambers 39 and passages 38, is exhausted into the windchests and from the latter through hollow box 50 and connected tubes to the box 53 and thence through the passages 54 into wind throat 55, from whence it is exhausted through passages 62, into the bellows, it being understood that air at the same time passes from the equalizer 60 to the tube 59 into box 58 and thence through the windthroat to the bellows, the equalizer performing its common and well known function. The collapse of the pneumatics as stated, causes rods 30 to rise and elevate the thrust rods or abstracts of the piano mechanism, and through the piano action mechanism on the strings produces sound. The instant said perforations in the note sheet pass out of engagement with the tracker-bar passages, the diaphragms 49 and valves 43 drop to their original positions and air entering openings 40 reëxpands the pneumatics and permits the abstracts and piano action mechanism to resume their original positions, the small volume of air in the tubes between the tracker-bar and passages 24 finding a vent through the vent holes 25 into the wind chests 16.

When it is desired to produce the maximum volume of sound the lever 152 is swung to the right to raise rod 147 and effect the withdrawal of the damper from the strings. When it is desired to produce softer music, the lever 146 is operated for the purpose of raising rod 140 and thereby causing the hammer rail to move the hammers nearer to the strings and thus shorten their stroke.

If the operator prefers the keys can be prevented from operating when their respective hammers are in operation by swinging lever 163 to the right, this action through the crank arm 161, and link 160 sliding bar 157 to the right, this movement through the engaging inclined surface 156 and 159, see Fig. 14, causing said bar to move upward until its under surface rests upon the upper portion of the bases of notches 155 in which position the bar will engage the undersides of the front portions of the keys and prevent such portions from dropping downward when the weight of the abstracts and their connections is removed.

To rewind the note sheet on the roller 5, the lever 88 is swung to the left, this action through the connections described throws the pinion 100 out of engagement with wheel 101 and interlocks the clutch 97 with clutch wheel 102, so as to cause the latter to rotate with shaft 98 and through the sprocket chain 103, sprocket wheel 104, reverse the operation of the note sheet roller. The operation of said lever likewise through link 83, bell crank 80, link 79, and crank arm 78, operates the rock shaft 77 and causes valves 56 to close communication between box 53 and the wind throat. As a result of this, the vacuum of the wind chest 19 is destroyed and the air pressure therein maintains the valves 43 in their depressed position and prevents the collapse of the pneumatics and consequently the operation of the piano action mechanism.

To facilitate the rewinding operation, the lever 139 can be thrown to the left so as to swing arm 127 of and turn valve 128, Figs. 10 and 11, to the left in order to effect registration between the large end of valve opening 129 with tube 122. The result of this connection is to increase the area of communication between the bellows and the motor pneumatics in order that the latter may be operated with less foot pressure on the pedals and at greater speed and therefore effect the rewinding of the note sheet onto the note-sheet roller easily and quickly.

When desired the operator by pressing springs 71 into slots and at the same time pressing down on the pedals, can cause the sleeves 67 to slide forward on the side bars 68 of the pedals. The front ends of the latter are then swung upward with bearings 74 as the fulcrum until the entire pedal mechanism is occupying an inoperative position within the piano case.

Having thus described the invention what I claim as new and desire to secure by Letters Patent, is:—

1. The combination with a piano case having the usual blocks at the ends of the keyboard, of hollow blocks resting on the said blocks, a wind chest bridging the keyboard and resting at its ends on and communicating with said blocks, a transverse wind throat underlying the keyboard and standing on edge, and hollow blocks connected to the first-named hollow blocks and having valve controlled passages communicating with the wind throat.

2. The combination with a piano case having the usual blocks at the ends of the keyboard, of hollow blocks resting on the said blocks, a wind chest bridging the keyboard and resting at its ends on and communicating with said blocks, a transverse wind throat underlying the keyboard and standing on edge, hollow blocks connected to the first-named hollow blocks and having valve controlled passages communicating with the wind throat, a transversely extending rock-shaft journaled in the wind throat and projecting beyond one end of the same and provided at such end with a crank arm and within the chest with arms adapted for unseating said valves, a lever, and connections between the same and said crank arm to operate the rock shaft.

3. The combination with a piano case having the usual blocks at the ends of the keyboard, of hollow blocks resting on said blocks, a wind chest bridging the keyboard and resting at its ends on and communicating with said blocks, a transverse wind throat underlying the keyboard and standing on edge, hollow blocks connected to the first-named hollow blocks and having valve-controlled passages communicating with the wind-throat, a pendent extension for one end of the wind throat, an equalizer pneumatic and a tube connecting such pneumatic with said extension.

In testimony whereof I affix my signature, in the presence of two witnesses.

FREDERICH W. WOOD.

Witnesses:
WM. R. BERRY,
G. Y. THORPE.